United States Patent
Fang et al.

(10) Patent No.: US 11,320,680 B2
(45) Date of Patent: May 3, 2022

(54) VIEWING ANGLE SWITCH MODULE AND DISPLAY APPARATUS

(71) Applicant: Coretronic Corporation, Hsin-Chu (TW)

(72) Inventors: Chung-Yang Fang, Hsin-Chu (TW); Ping-Yen Chen, Hsin-Chu (TW); Yang-Ching Lin, Hsin-Chu (TW); Jen-Wei Yu, Hsin-Chu (TW); Yu-Fan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/835,160

(22) Filed: Mar. 30, 2020

(65) Prior Publication Data
US 2020/0326567 A1 Oct. 15, 2020

(30) Foreign Application Priority Data
Apr. 9, 2019 (CN) .......................... 201910279017.8

(51) Int. Cl.
G02F 1/13 (2006.01)
G02F 1/1337 (2006.01)
G02F 1/1335 (2006.01)

(52) U.S. Cl.
CPC ...... *G02F 1/1323* (2013.01); *G02F 1/133528* (2013.01); *G02F 1/133753* (2013.01); *G02F 1/133757* (2021.01)

(58) Field of Classification Search
CPC ............. G02F 1/1323; G02F 1/133528; G02F 1/133753; G02F 1/133757

(Continued)

(56) References Cited

U.S. PATENT DOCUMENTS

2005/0286000 A1* 12/2005 Tsai ...................... G02F 1/1333
349/119
2010/0243970 A1* 9/2010 Toshimitsu ........... G03F 7/0007
252/582

(Continued)

FOREIGN PATENT DOCUMENTS

CN 206920756 1/2018
CN 208126055 11/2018

(Continued)

OTHER PUBLICATIONS

"Office Action of Taiwan Counterpart Application", dated Jun. 30, 2020, p. 1-p. 8.

(Continued)

*Primary Examiner* — Edward J Glick
*Assistant Examiner* — David Y Chung
(74) *Attorney, Agent, or Firm* — JCIPRNET

(57) ABSTRACT

A viewing angle switch module including a viewing angle limiting device and a first electrically controlled viewing angle switch device is provided. A plurality of first block walls of the viewing angle limiting device are arranged along a first direction and extended in a second direction. The first electrically controlled viewing angle switch device has a first liquid crystal layer, a first polarizer and a second polarizer. An angle of 90±20 degrees is included between an optical axis of the first liquid crystal layer and the first direction. The first polarizer and the second polarizer are respectively located at two opposite sides of the first liquid crystal layer. An absorption axis of the first polarizer and a, absorption axis of the second polarizer are parallel to or perpendicular to the first direction. A display apparatus adopting the viewing angle switch module is also provided.

9 Claims, 11 Drawing Sheets

(58) Field of Classification Search
USPC .......................................................... 349/74
See application file for complete search history.

(56) References Cited

U.S. PATENT DOCUMENTS

| | | | | |
|---|---|---|---|---|
| 2012/0224121 | A1* | 9/2012 | Gilbert | H04N 13/337 |
| | | | | 349/64 |
| 2014/0110040 | A1* | 4/2014 | Cok | G02B 5/3058 |
| | | | | 156/182 |
| 2018/0052271 | A1* | 2/2018 | Wang | C08F 112/20 |
| 2018/0113334 | A1* | 4/2018 | Fang | G02F 1/13471 |
| 2018/0210243 | A1* | 7/2018 | Fang | G02F 1/1334 |
| 2019/0346708 | A1* | 11/2019 | Wang | G02F 1/13306 |

FOREIGN PATENT DOCUMENTS

| | | |
|---|---|---|
| TW | M537663 | 3/2017 |
| TW | I612360 | 1/2018 |
| TW | M563556 | 7/2018 |
| TW | M570442 | 11/2018 |
| WO | 2018022098 | 2/2018 |
| WO | 2018130044 | 7/2018 |

OTHER PUBLICATIONS

"Office Action of Taiwan Counterpart Application", dated Apr. 23, 2020, p. 1-p. 8.

* cited by examiner

VIEWING ANGLE SWITCH MODULE AND DISPLAY APPARATUS

CROSS-REFERENCE TO RELATED APPLICATION

This application claims the priority benefit of China application serial no. 201910279017.8, filed on Apr. 9, 2019. The entirety of the above-mentioned patent application is hereby incorporated by reference herein and made a part of this specification.

BACKGROUND

Technical Field

The invention relates to an optical module and a display apparatus, and particularly relates to a viewing angle switch module and a display apparatus.

Description of Related Art

Generally, a display device is usually designed to have a wide viewing angle for displaying so as to be viewed by multiple viewers. However, in some situations or on some occasions, for example, when browsing a private website, viewing some confidential information, or entering a password, a user may be subjected to leak some private or confidential information due to the wide viewing angle of a display which may be viewed by others somewhere else. Typically, in order to achieve an anti-peep effect, a light control film (LCF) may be placed in front of a display panel to filter out large-angle image beams. Conversely, when there is no need for anti-peeping, the light control film may be also removed manually from the front of the display panel. In other words, although such a light control film has a good anti-peep effect, there is still room for improvement in its operational convenience. Therefore, how to develop a display apparatus with convenient viewing angle switching and excellent anti-peep effect has become an important issue for the related manufacturers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a viewing angle switch module with favorable large viewing angle filtering effect.

The invention provides a display apparatus with favorable anti-peep performance.

Other features and advantages of the invention can be further understood by the technical features disclosed in the invention.

To achieve one, part, or all of the objectives aforementioned or other objectives, an embodiment of the invention provides a viewing angle switch module. The viewing angle switch module includes a viewing angle limiting device and a first electrically controlled viewing angle switch device. The viewing angle limiting device has a plurality of first block walls, and the first block walls are arranged along a first direction and extended in a second direction. A light-transmitting region is disposed between any two adjacent first block walls. The first electrically controlled viewing angle switch device is overlapped with the viewing angle limiting device. The first electrically controlled viewing angle switch device includes a first liquid crystal layer, a first polarizer and a second polarizer. An angle of 90±20 degree is included between an optical axis of the first liquid crystal layer and the first direction. The first polarizer and the second polarizer are respectively located at two opposite sides of the first liquid crystal layer, and an absorption axis of the first polarizer and an absorption axis of the second polarizer are parallel or perpendicular to the first direction.

To achieve one, part, or all of the objectives aforementioned or other objectives, another embodiment of the invention provides a display apparatus. The display apparatus includes a display panel, a viewing angle limiting device and a first electrically controlled viewing angle switch device. The viewing angle limiting device is overlapped with the display panel and has a plurality of first block walls. The first block walls are arranged along a first direction and extended in a second direction. A light-transmitting region is disposed between any two adjacent first block walls. The first electrically controlled viewing angle switch device is overlapped with the viewing angle limiting device. The first electrically controlled viewing angle switch device includes a first liquid crystal layer, a first polarizer and a second polarizer. An angle of 90±20 degree is included between an optical axis of the first liquid crystal layer and the first direction. The first polarizer and the second polarizer are respectively located at two opposite sides of the first liquid crystal layer, and an absorption axis of the first polarizer and an absorption axis of the second polarizer are parallel or perpendicular to the first direction.

In view of the above, the embodiments of the invention have at least one of the following advantages or effects. In the viewing angle switch module according to an embodiment of the invention, through the cooperation between an extending direction of the block walls of the viewing angle limiting device and an axial direction of the optical axis of the liquid crystal layer of the electrically controlled viewing angle switch device, a large viewing angle filtering effect can be effectively enhanced. In addition, the display apparatus according to an embodiment of the invention, due to adopting the viewing angle switch module of the aforementioned embodiment, has excellent convenience when switching between an anti-peep mode and a sharing mode, and a large viewing angle filtering ability thereof is conducive to improving the anti-peep effect of the display apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
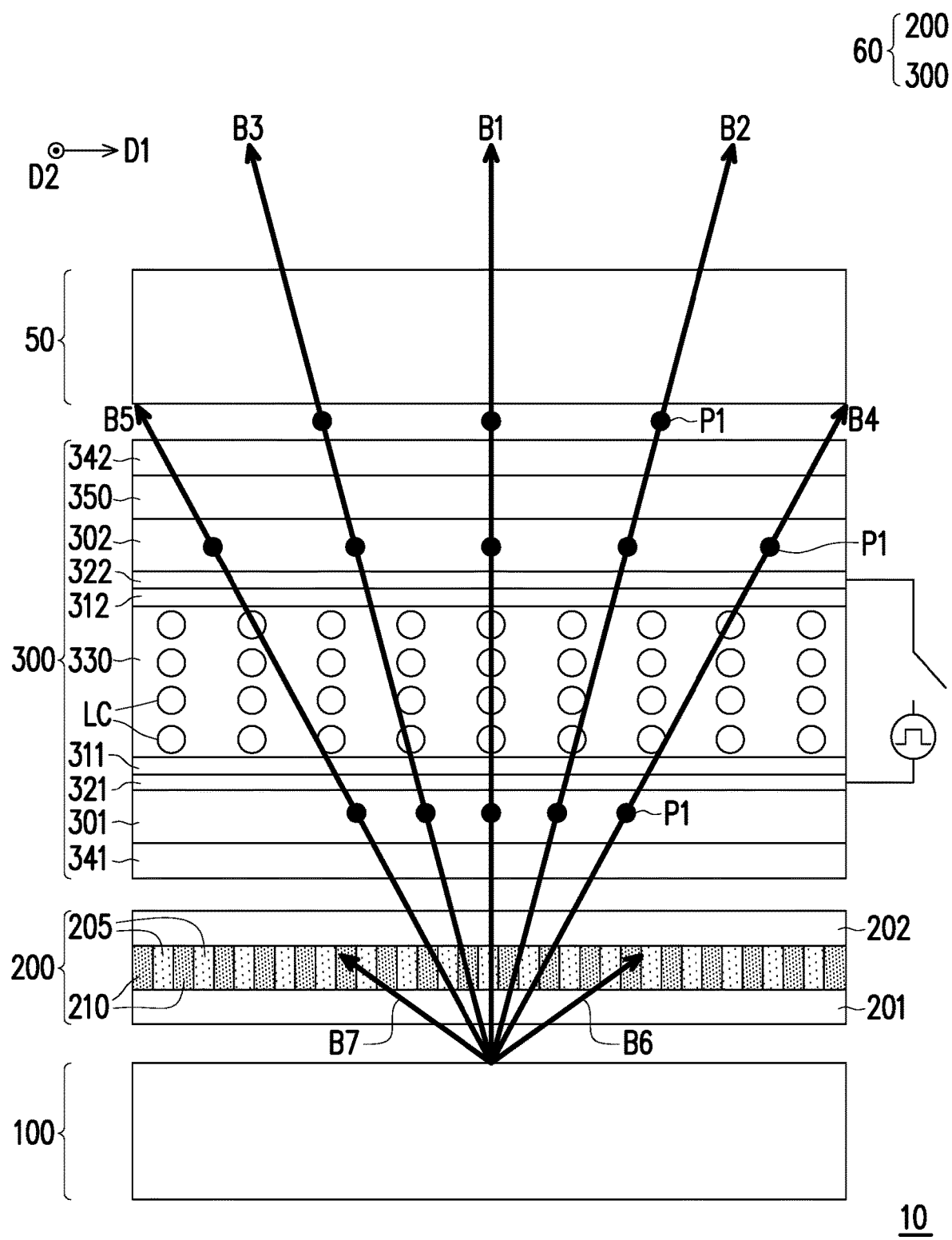
FIG. 1 and FIG. 2 are schematic cross-sectional views illustrating a display apparatus operating respectively under a sharing mode and an anti-peep mode according to a first embodiment of the invention.
Figure 2:
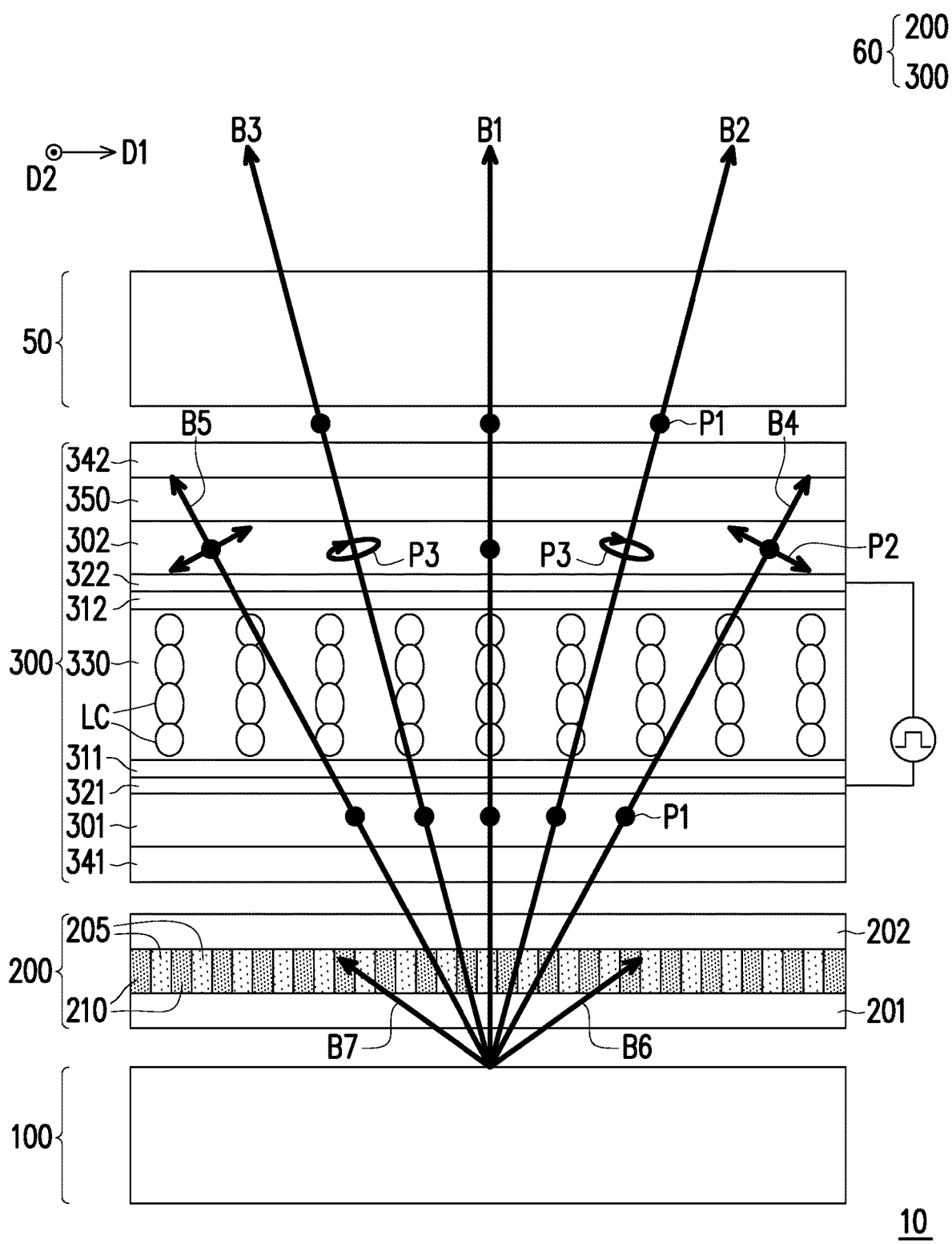
Figure 3:
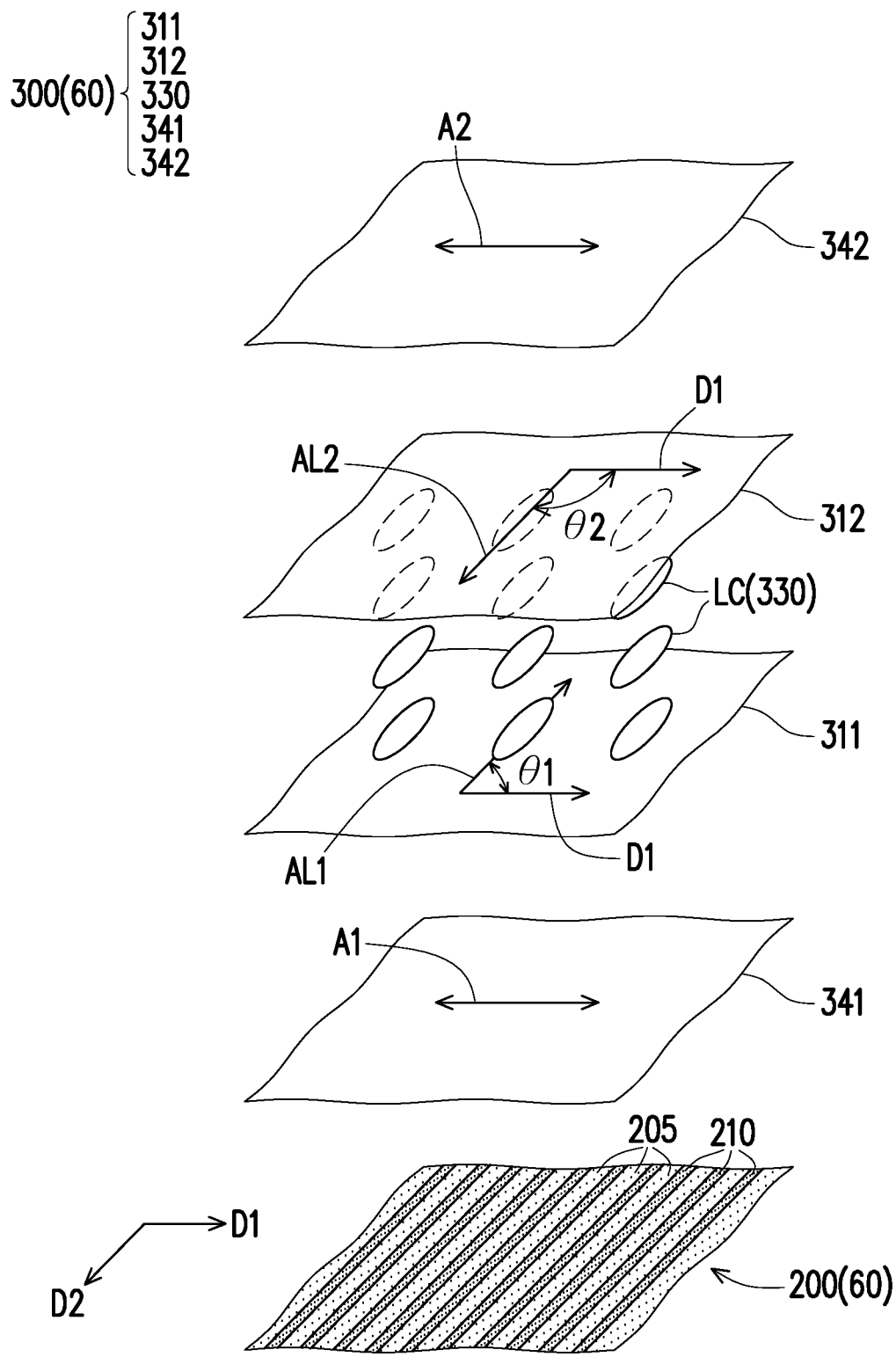
FIG. 3 is schematic view illustrating a part of film layers of a viewing angle switch module of FIG. 1.
Figure 4:
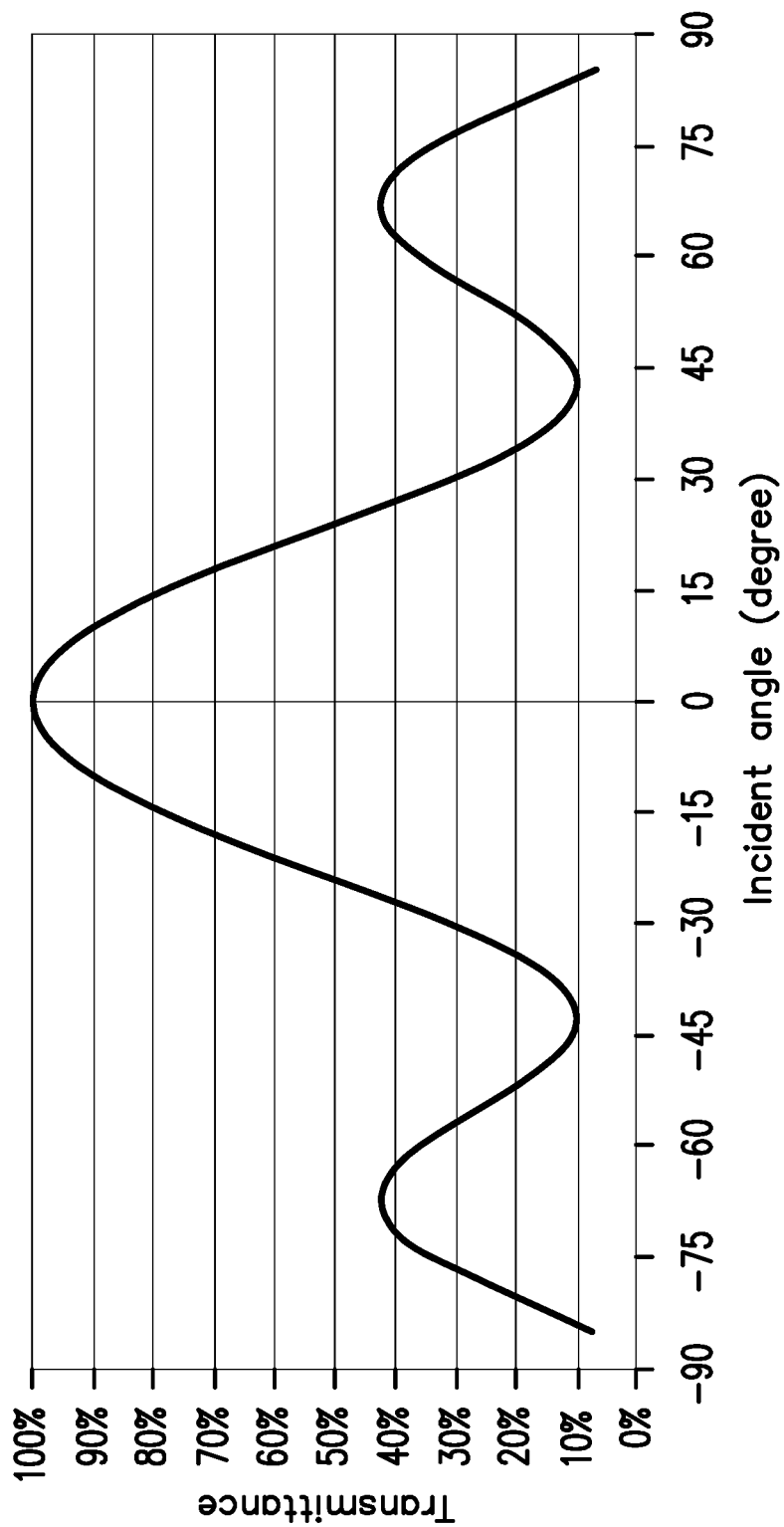
FIG. 4 is a graph of viewing angle versus transmittance of an electrically controlled viewing angle switch device of FIG. 1.
Figure 5:
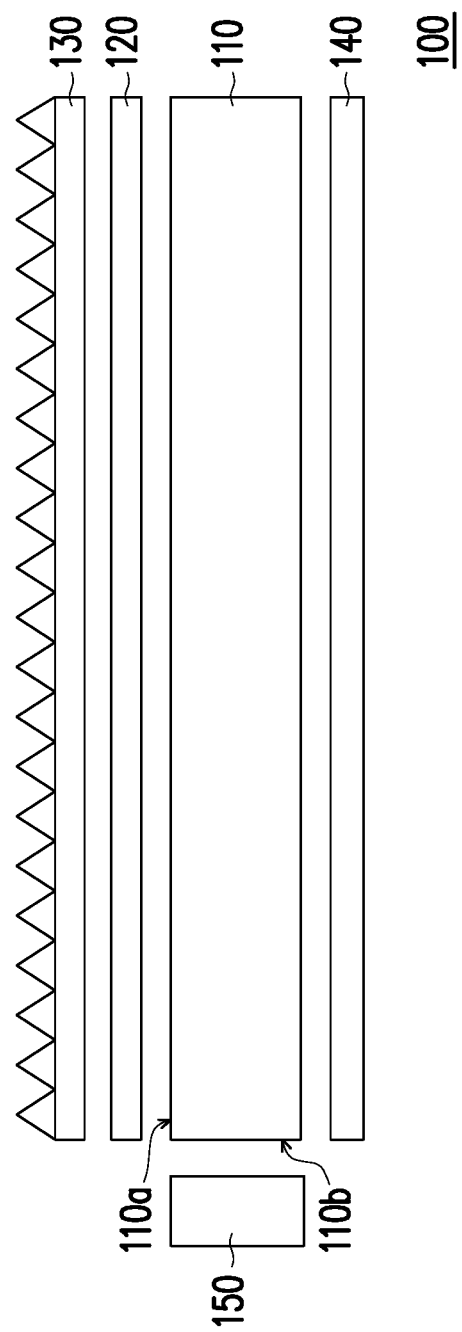
FIG. 5 is a schematic cross-sectional view of a backlight module of FIG. 1.

FIG. 1 and FIG. 2 are schematic cross-sectional views illustrating a display apparatus operating respectively under a sharing mode and an anti-peep mode according to a first embodiment of the invention. FIG. 3 is schematic view illustrating a part of film layers of a viewing angle switch module of FIG. 1. FIG. 4 is a graph of viewing angle versus transmittance of an electrically controlled viewing angle switch device of FIG. 1. FIG. 5 is a schematic cross-sectional view of a backlight module of FIG. 1. It should be noted that, for clarity of presentation, FIG. 3 omits the illustrations of a plurality of substrates 201, 202, 301 and 302, two conductive layers 321 and 322 and a phase retardation film 350 of FIG. 1.

Referring to FIG. 1 and FIG. 3, a display apparatus 10 includes a display panel 50 and a viewing angle switch module 60, wherein the viewing angle switch module 60 enables the display apparatus 10 to be switchable between the sharing mode and the anti-peep mode. In the present embodiment, the display panel 50 is, for example, a liquid crystal display panel or other suitable non-self-emissive display panel. Therefore, the display apparatus 10 may further selectively include a backlight module 100, wherein the viewing angle switch module 60 is located between the display panel 50 and the backlight module 100. However, the invention is not limited to. In other embodiments, the display panel 50 of the display apparatus 10 may also be an organic light emitting diode (OLED) panel, a micro light emitting diode (Micro LED) panel or other suitable self-emissive display panel, and the viewing angle switch module 60 is disposed at a light-emitting side of the display panel 50.

Furthermore, the viewing angle switch module 60 includes a viewing angle limiting device 200 and an electrically controlled viewing angle switch device 300. In detail, the viewing angle limiting device 200 has the substrate 201 and a plurality of first block walls 210, wherein the first block walls 210 are arranged on the substrate 201 along a direction D1 and are extended in a direction D2. Specifically, a light-transmitting pattern may be disposed between any two adjacent first block walls 210, and the light-transmitting pattern has a high transmittance for a light beam emitted by backlight module 100, that is, any two adjacent first block walls 210 have a light-transmitting region 205 therebetween. It is to be noted that, in the present embodiment, the number and spacing (i.e., distribution density) of the first block walls 210 (or the light-transmitting patterns) are for illustrative purpose only, and the invention is not limited by the disclosure of the drawings.

It is worth mentioning that, it can be known from FIG. 1, the light beam emitted by the backlight module 100 can pass through the first block walls 210, that is, the first block walls 210 are not completely opaque. For example, a plurality of light beams B2-B5, after passing through one first block wall 210 and losing a part of light energy, can still be transmitted to the electrically controlled viewing angle switch device 300, while two light beams B6 and B7, due to each being required to pass through two first block walls 210, loss all the light energy during the process of passing through the two first block walls 210 and cannot be transmitted to the electrically controlled viewing angle switch device 300. In other words, a transmittance of the viewing angle limiting device 200 at a large viewing angle (e.g., a viewing angle greater than 45 degree) can be determined by the number of the first block walls 210 (i.e., the distribution density of the first block walls 210) through which the light beam is required to pass. However, the invention is not limited thereto. In other embodiments, the transmittance of the viewing angle limiting device 200 at the large viewing angle may also be determined in addition with a transmittance of the first block walls 210. For example, in some embodiments, the transmittance of the first block walls 210 within a wavelength range of 400 nm to 700 nm can be smaller than 50%. Particularly, a viewing angle of the viewing angle limiting device 200 can be defined by a viewing angle range with a transmittance greater than 5%. In addition, in order to increase luminance and viewing angle of the display panel 50, a reflective polarizer may be disposed at a side of the viewing angle limiting device 200 (a side of the viewing angle limiting device 200 that is away from the electrically controlled viewing angle switch device 300, for example).

On the other hand, a material of the light-transmitting patterns may include polycarbonate (PC), poly(methyl methacrylate) (PMMA), cyclo-olefin polymer (COP), cyclo-olefin copolymer (COC), other high light transmission material, or air. In the present embodiment, the viewing angle limiting device 200 may further selectively has another substrate 202, such that the first block walls 210 and the light-transmitting patterns are sandwiched between the substrate 201 and the substrate 202, but the invention is not limited thereto.

Referring to FIG. 1 and FIG. 3, the electrically controlled viewing angle switch device 300 includes a first substrate 301, a second substrate 302, a first alignment layer 311, a second alignment layer 312, and a liquid crystal layer 330, wherein the first alignment layer 311 and the second alignment layer 312 are disposed between the first substrate 301 and the second substrate 302, and the liquid crystal layer 330 is sandwiched between the first alignment layer 311 and the second alignment layer 312. It is to be particularly noted that, the alignment layers are used for aligning a plurality of liquid crystal molecules LC of the liquid crystal layer 330 so that optical axes of the liquid crystal molecules LC are oriented in a predetermined direction. In the present embodiment, the first alignment layer 311 and the second alignment layer 312 respectively have a first alignment direction AL1 and a second alignment direction AL2, wherein an angle θ1 included between the first alignment direction AL1 and the direction D1 may selectively be 90 degrees, and an angle θ2 included between the second alignment direction AL2 and the direction D1 may selectively be 90 degrees. That is, the optical axes of the liquid crystal molecules LC of the liquid crystal layer 330 may be perpendicular to the direction D1. However, the invention is not limited thereto. In some embodiments, the angle θ1 included between the first alignment direction AL1 and the direction D1 may range from 70 degrees to 110 degrees, and the angle θ2 included between the second alignment direction AL2 and the direction D1 may range from 70 degrees to 110 degrees. That is, axial directions of the optical axes of the liquid crystal molecules LC are a same direction, and the angles included between the optical axes of the liquid crystal molecules and the direction D1 may range from 70 degrees to 110 degrees.

On the other hand, the electrically controlled viewing angle switch device 300 further includes a polarizer 341 and a polarizer 342, wherein the polarizer 341 is disposed at a side of the first substrate 301 that is away from the liquid crystal layer 330, the polarizer 342 is disposed at a side of the second substrate 302 that is away from the liquid crystal layer 330, and an absorption axis A1 of the polarizer 341 and an absorption axis A2 of the polarizer 342 are parallel to the direction D1. It is worth mentioning that, in the present embodiment, since the optical axes of the liquid crystal molecules LC are perpendicular to an arrangement direction (i.e., the direction D1) of the first block walls 210 of the viewing angle limiting device 200, the absorption axis A1 of the polarizer 341 and the absorption axis A2 of the polarizer 342 can be parallel to the arrangement direction (i.e., the direction D1) of the first block walls 210 of the viewing angle limiting device 200. Thus, the arrangement direction of the first block walls 210 can be defined as a viewing angle control direction of the viewing angle switch module 60.

In addition, the electrically controlled viewing angle switch device 300 further includes a first conductive layer 321 and a second conductive layer 322, wherein the first conductive layer 321 is disposed between the first substrate 301 and the first alignment layer 311, and the second conductive layer 322 is disposed between the second substrate 302 and the second alignment layer 312. In detail, when the first conductive layer 321 and the second conductive layer 322 are enabled so that the two conductive layers have a potential difference therebetween, this potential difference can generate an electric field between the two conductive layers so as to drive the liquid crystal molecules LC of the liquid crystal layer 330 to rotate. In the present embodiment, the first conductive layer 321 and the second conductive layer 322 are, for example, light transmissive electrodes, and a material of the light transmissive electrodes includes indium tin oxide, indium zinc oxide, aluminum tin oxide, aluminum zinc oxide, or other suitable oxide, very thin metal, metal mesh or wire grid, carbon nanotube, Ag nano-wire, graphene or a stacked layer of at least two of the above.

In the following, two operational modes (i.e., the sharing mode and the anti-peep mode) of the display apparatus 10 are exemplarily described. Firstly, referring to FIG. 1 and FIG. 3, when the display apparatus 10 is operated under the sharing mode, there is no potential difference between the first conductive layer 321 and the second conductive layer 322 of the electrically controlled viewing angle switch device 300, and the liquid crystal molecules LC, without being driven by an external electric filed, are arranged along the alignment direction of the alignment layer (i.e. the direction D2). At this moment, the light beams B1-B5 emitted by the backlight module 100 each has a first linear polarization P1 after passing through the polarizer 341, and a polarization direction of the first linear polarization P1 is perpendicular to an axial direction of the absorption axis A1 of the polarizer 341. Since the liquid crystal layer 330 does not produce any phase retardation for the light beams B1-B5 incident at different angles, the light beams B1-B5 still have the first linear polarization P1 after passing through the liquid crystal layer 330, so that the light beams B1-B5 can be transmitted to the display panel 50 after passing through the polarizer 342.

Next, referring to FIG. 2 and FIG. 3, when the display apparatus 10 is operated under the anti-peep mode, the first conductive layer 321 and the second conductive layer 322 of the electrically controlled viewing angle switch device 300 are enabled and thus have different potentials, and an electric field generated by a potential difference between the two conductive layers can drive the liquid crystal molecules LC of the liquid crystal layer 330 to rotate. At this moment, the liquid crystal layer 330 can produce different phase retardations for the light beams B1-B5 incident at different angles, the light beams B1-B5 are enabled to respectively have different polarization states after passing through the liquid crystal layer 330. For example, after passing through the liquid crystal layer 330, the light beam B1 still has the first linear polarization P1, the light beam B2 and the light beam B3 respectively have an elliptical polarization P3, while the light beam B4 and the light beam B5 respectively have a second linear polarization P2. Therefore, in the light beams B1-B5 from the liquid crystal layer 330, only the light beam B1, the light beam B2 and the light beam B3 can be transmitted to the display panel 50 through the polarizer 342, while the light beam B4 and the light beam B5 are absorbed due to their polarization direction being parallel to an axial direction of the absorption axis A2 of the polarizer 342.

As shown in FIG. 4, the electrically controlled viewing angle switch device 300 has a relatively high transmittance for an incident light beam of a small angle (e.g., an incident angle ranged from −20 degrees to 20 degrees), while has a relative low transmittance for an incident light beams of a large angle. In the present embodiment, in terms relative to a light beam incident at an angle of 45 degrees, the electrically controlled viewing angle switch device 300 still has a higher transmittance for a light beam with an incident angle greater than 45 degrees, that is, the electrically controlled viewing angle switch device 300 has a relatively poor optical filtering effect (or anti-peep effect) for a light beam with an incident angle greater than 45 degrees. It is to be particularly mentioned that, in the present embodiment, by designing the viewing angle of the viewing angle limiting device 200 to be within a range of −45 degrees to 45 degrees (i.e., the viewing angle of the viewing angle limiting device 200 being 90 degrees), the viewing angle switch module 60 is able to have a favorable anti-peep effect. However, the invention is not limited thereto. In another embodiment, the viewing angle of the viewing angle limiting device 200 may also be designed within a range of −60 degrees to 60 degrees (i.e., the viewing angle of the viewing angle limiting device 200 being 120 degrees), so that the display apparatus can have favorable optical performance when operated under both the sharing mode and the anti-peep mode. In yet another embodiment, the viewing angle of the viewing angle limiting device 200 may also be designed within a range of −70 degrees to 70 degrees (i.e., the viewing angle of the viewing angle limiting device 200 being 140 degrees), and thus is conducive to increase the viewing angle of the display apparatus when operated under the sharing mode.

It is to be particularly explained that, the viewing angle switch module 60 can adjust its overall optical filtering effect at the large viewing angle through the cooperative relationship between the viewing angle limiting device 200 and the electrically controlled viewing angle switch device 300. In other words, the configuration of the viewing angle limiting device 200 is facilitative to enhance a design margin of the viewing angle switch module 60, so as to meet the demands of diverse applications.

Moreover, the electrically controlled viewing angle switch device 300 may further selectively include a phase retardation film 350 disposed between the polarizer 341 and the polarizer 342. In the present embodiment, the phase retardation film 350 may selectively be disposed between the polarizer 342 and the liquid crystal layer 330, or the phase retardation film 350 may selectively be disposed between the polarizer 342 and the second substrate 302, but the invention is not limited thereto. In other embodiments, the phase retardation film 350 may also be disposed between the polarizer 341 and the first substrate 301. In the present embodiment, the phase retardation film 350 is for example, a C-type plate, a negative C-type plate, an A-type plate, a B-type plate (Bi-Axial plate), an O-type plate, or a composite board constituted by two A-type plates whose optical axes intersect each other, but the invention is not limited thereto. It is to be explained that, in the present embodiment, the number of the phase retardation film 350 is exemplarily illustrated for the purpose of explanation, and the invention is not limited thereto. In another embodiment, the electrically controlled viewing angle switch device 300 may also include two B-type plates, wherein one of the B-type plates is located between the polarizer 341 and the liquid crystal layer 330, or between the polarizer 341 and the first substrate 301, while the other one of the B-type plates is located between the polarizer 342 and the second substrate 302.

In another embodiment, as shown in FIG. 1 to FIG. 3, when the phase retardation film 350 of the electrically controlled viewing angle switch device 300 is the C-type plate, the A-type plate or the B-type plate, during the sharing mode, a potential difference higher than that of the anti-peep mode can be applied between the first conductive layer 321 and the second conductive layer 322 so that the optical axes of the liquid crystal molecules LC of the liquid crystal layer 330 are substantially perpendicular to the direction D1 and the direction D2 to offset the optical filtering effect of the phase retardation film 350 at oblique viewing angles (directions that are not the direction D1 and the direction D2), so as to obtain a larger viewing angle.

On the other hand, as shown in FIG. 5, the backlight module 100 may include a light guide plate 110, a diffusion sheet 120, a prism sheet 130, a reflective sheet 140, and a light source 150. The light guide plate 110 has a light emitting surface 110a and a light incident surface 110b connected to the light emitting surface 110a, wherein the light source 150 is disposed at a side of the light guide plate 110 that is disposed with the light incident surface 110b, the diffusion sheet 120 and the prism sheet 130 are disposed at a side of the light guide plate 110 that is disposed with the light emitting surface 110a, and the light guide plate 110 is located between the reflective sheet 140 and the diffusion sheet 120. It is to be particularly mentioned that, the prism sheet 130 has a plurality of optical microstructures, and the optical microstructures are disposed on a side of the prism sheet 130 that faces toward the viewing angle limiting device 200. That is to say, the display apparatus 10 with the anti-peep function may also adopt the blacklight module of the general display apparatus, which is conducive to lower the cost of the display apparatus 10.

In the following, other embodiments are provided to explain the disclosure in detail, wherein same components will be denoted by the same reference numerals, and the description of the same technical content will be omitted. For the omitted part, please refer to the foregoing embodiment, and the details are not described below. The descriptions regarding the omitted part may be referred to the previous embodiment, and thus will not be repeated herein.

Figure 6:
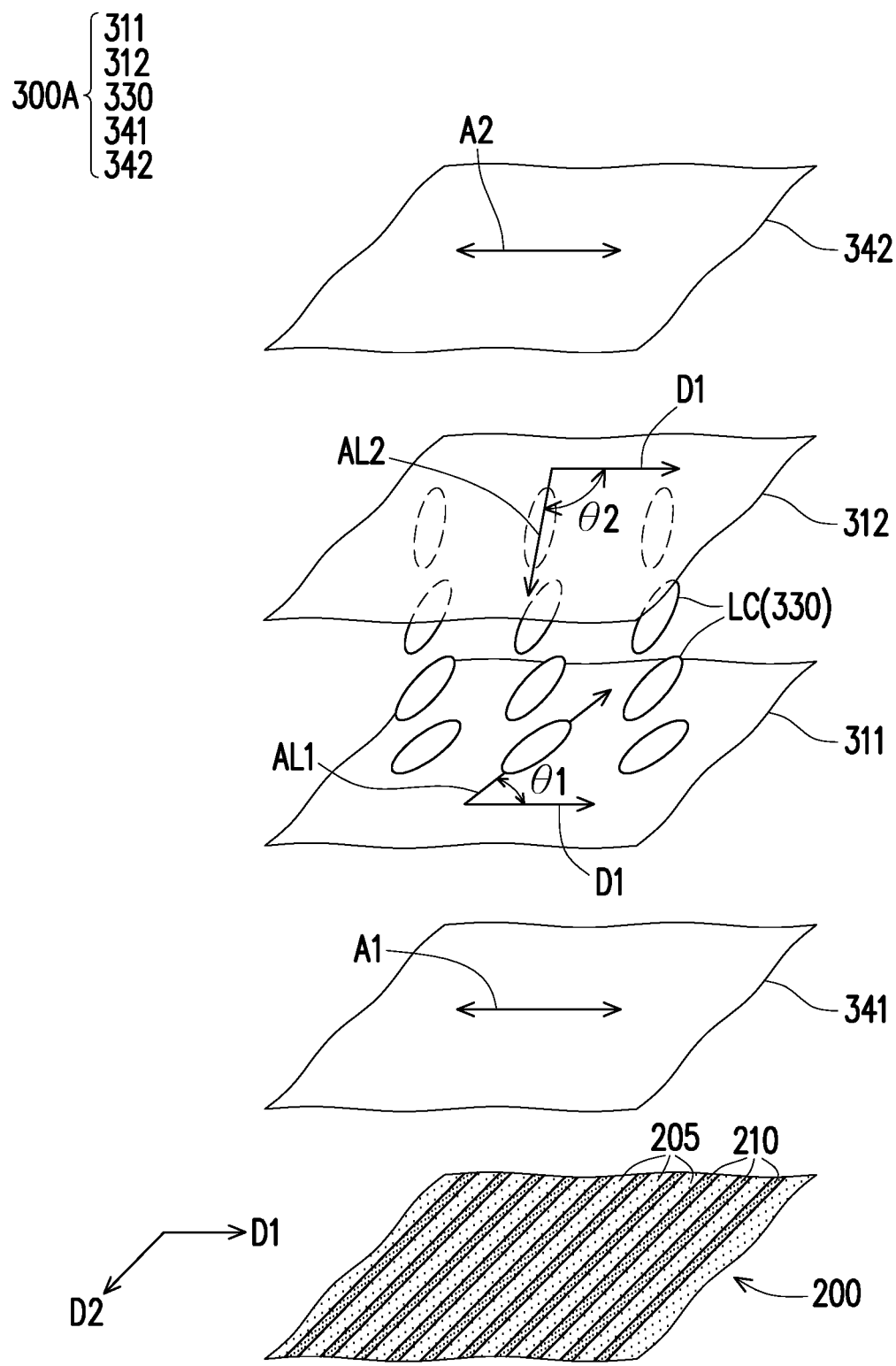
FIG. 6 is schematic view illustrating a part of film layers of a viewing angle switch module according to a second embodiment of the invention.

FIG. 6 is schematic view illustrating a part of film layers of a viewing angle switch module according to a second embodiment of the invention. Referring to FIG. 6, a difference between the electrically controlled viewing angle switch device 300A of the present embodiment and the electrically controlled viewing angle switch device 300 of FIG. 3 lies in: the optical axis configuration of the liquid crystal layer 330 of the electrically controlled viewing angle switch device 300A. In the present embodiment, the angle θ1 included between the first alignment direction AL1 of the first alignment layer 311 of the electrically controlled viewing angle switch device 300A and the direction D1 may selectively be greater than 70 degrees and smaller than 90 degrees, and the angle θ2 included between the second alignment direction AL2 of the second alignment layer 312 and the direction D1 may selectively be greater than 70 degrees and smaller than 90 degrees. As such, the liquid crystal molecules LC of the liquid crystal layer 330 sandwiched between the first alignment layer 311 and the second alignment layer 312 are arranged between the two alignment layers by means of twist deformation. In other words, an angle included between an overall optical axis of the liquid crystal layer 330 and the direction D1 (or the arrangement direction of the first block walls 210) may be in a range from 70 degrees to 110 degrees.

Figure 7:
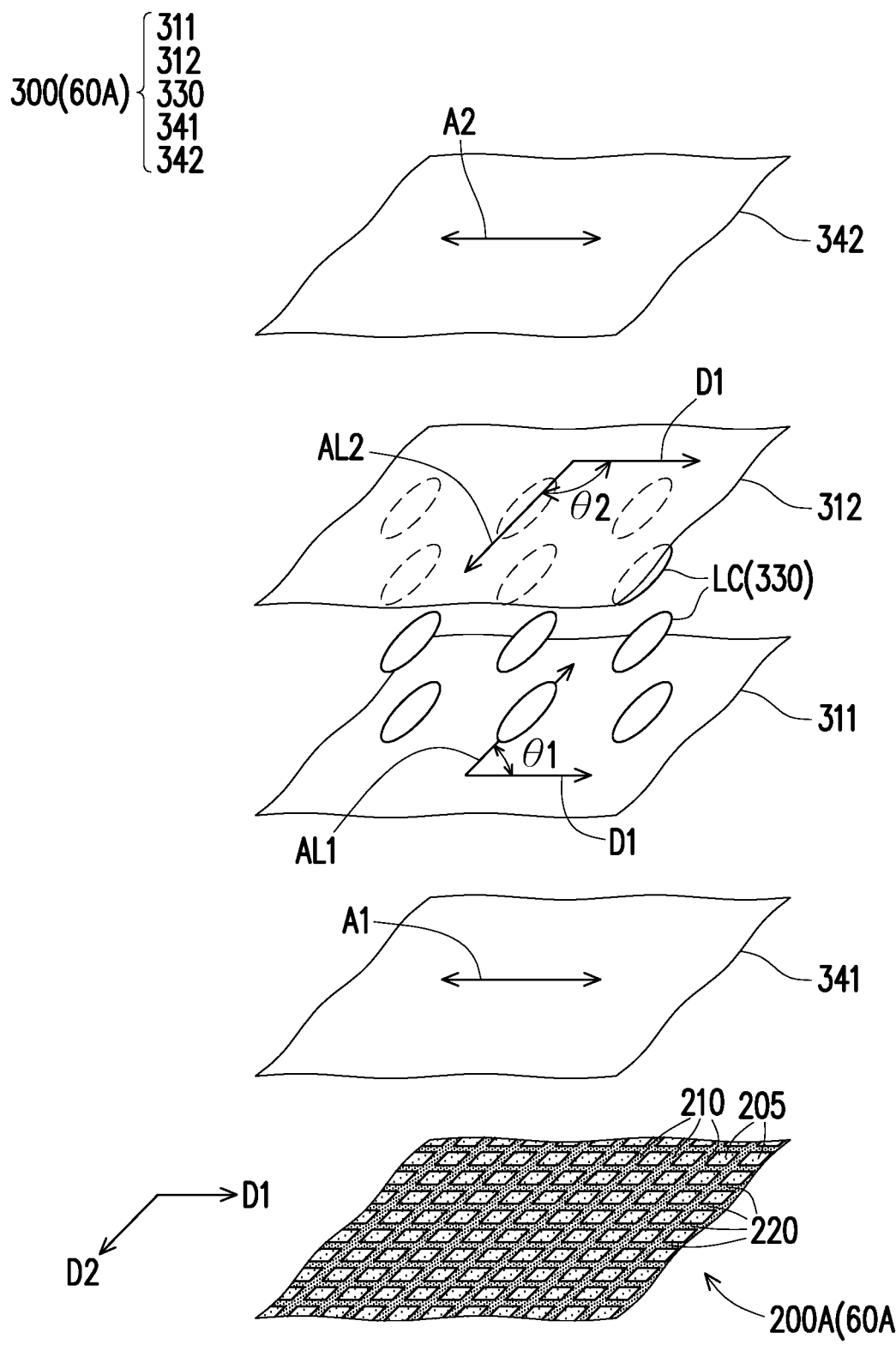
FIG. 7 is schematic view illustrating a part of film layers of a viewing angle switch module according to a third embodiment of the invention.

FIG. 7 is schematic view illustrating a part of film layers of a viewing angle switch module according to a third embodiment of the invention. Referring to FIG. 7, a difference between the viewing angle limiting device 200A of the present embodiment and the viewing angle limiting device 200 of FIG. 3 lies in: the configuration of the block walls. In the present embodiment, the viewing angle limiting device 200A further includes a plurality of second block walls 220, and the second block walls 220 are arranged along the direction D2 and extended in the direction D1. That is, the second block walls 220 and the first block walls 210 intersect with each other. As such, the viewing angle switch module 60A can also provide a large angle filtering effect in the direction D2, and a display apparatus adopting the viewing angle switch module 60A can have in the direction D2 an anti-peep function that does not require electronically controlled switching, so as to meet the demands of different product designs.

Figure 8:
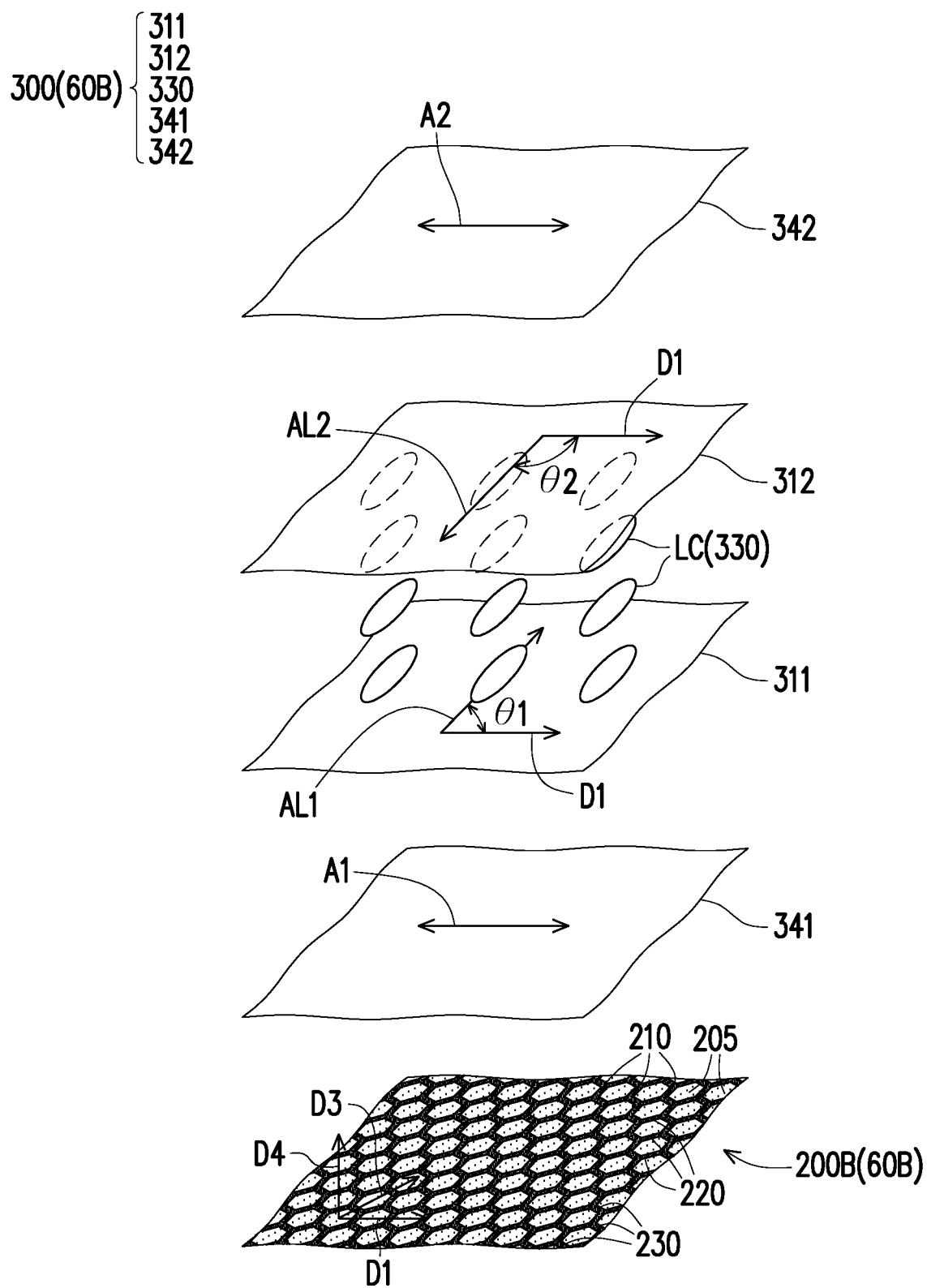
FIG. 8 is schematic view illustrating a part of film layers of a viewing angle switch module according to a fourth embodiment of the invention.

FIG. 8 is schematic view illustrating a part of film layers of a viewing angle switch module according to a fourth embodiment of the invention. Referring to FIG. 8, a difference between the viewing angle limiting device 200B of the present embodiment and the viewing angle limiting device 200 of FIG. 3 lies in: the configuration of the block walls. In detail, the viewing angle limiting device 200B further includes a plurality of second block walls 220 and a plurality of third block walls 230. The second block walls 220 are arranged along a direction D4, and are respectively connected with the first block walls 210 and the third block walls 230. The third block walls 230 are arranged along a direction D3, and are respectively connected with the first block walls 210 and the second block walls 220. From another point of view, the block walls of the viewing angle limiting device 200B of the present embodiment are arranged in a honeycomb pattern. As such, the viewing angle switch module 60B can also provide a large angle filtering effect in the direction D3 and the direction D4, and a display apparatus adopting the viewing angle switch module 60B can have in the direction D3 and the direction D4, respectively, an anti-peep function that does not require electronically controlled switching, so as to meet the demands of different product designs.

Figure 9:
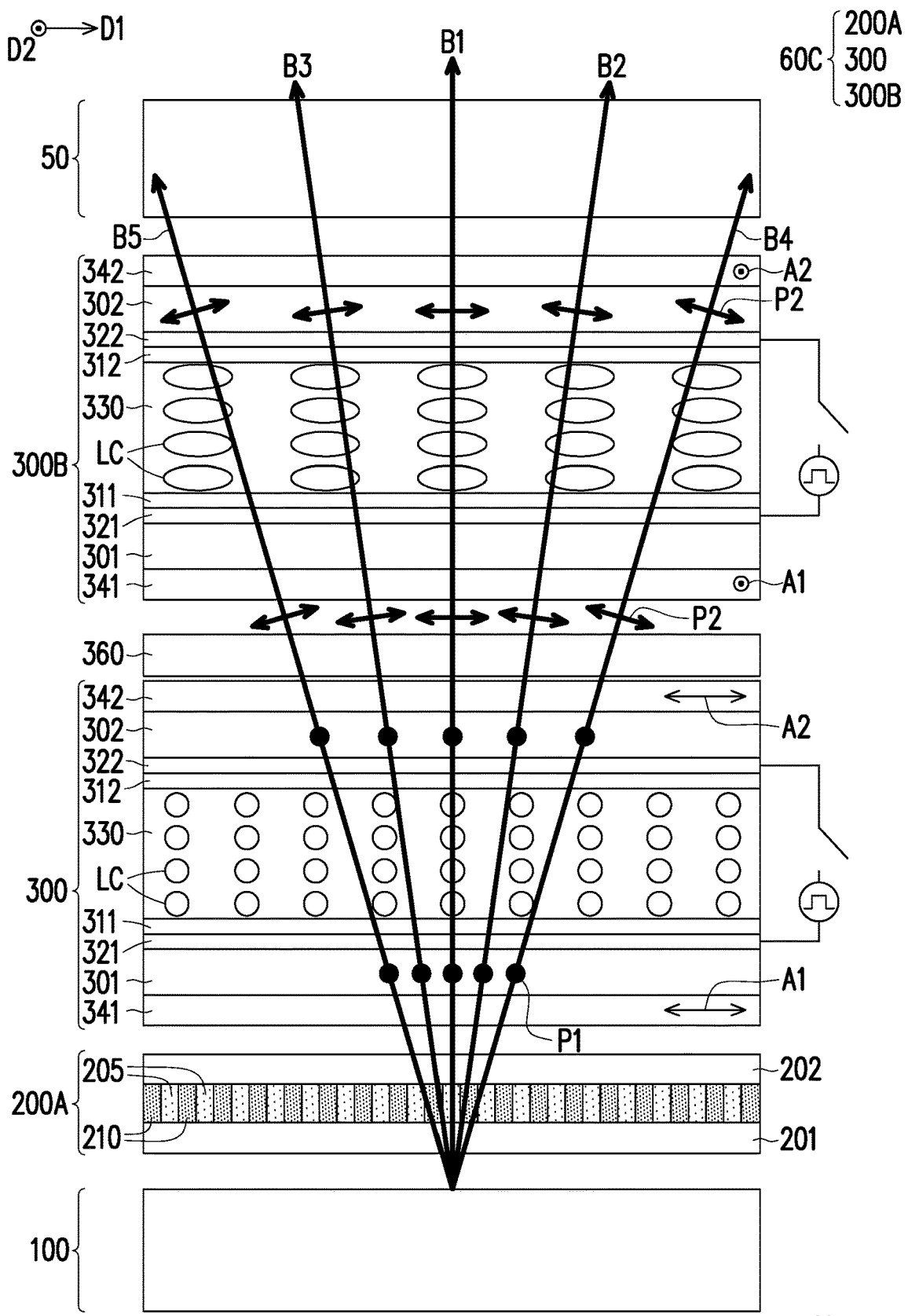
FIG. 9 is a schematic cross-sectional view illustrating a display apparatus operating under a sharing mode according to a fifth embodiment of the invention.
Figure 10:
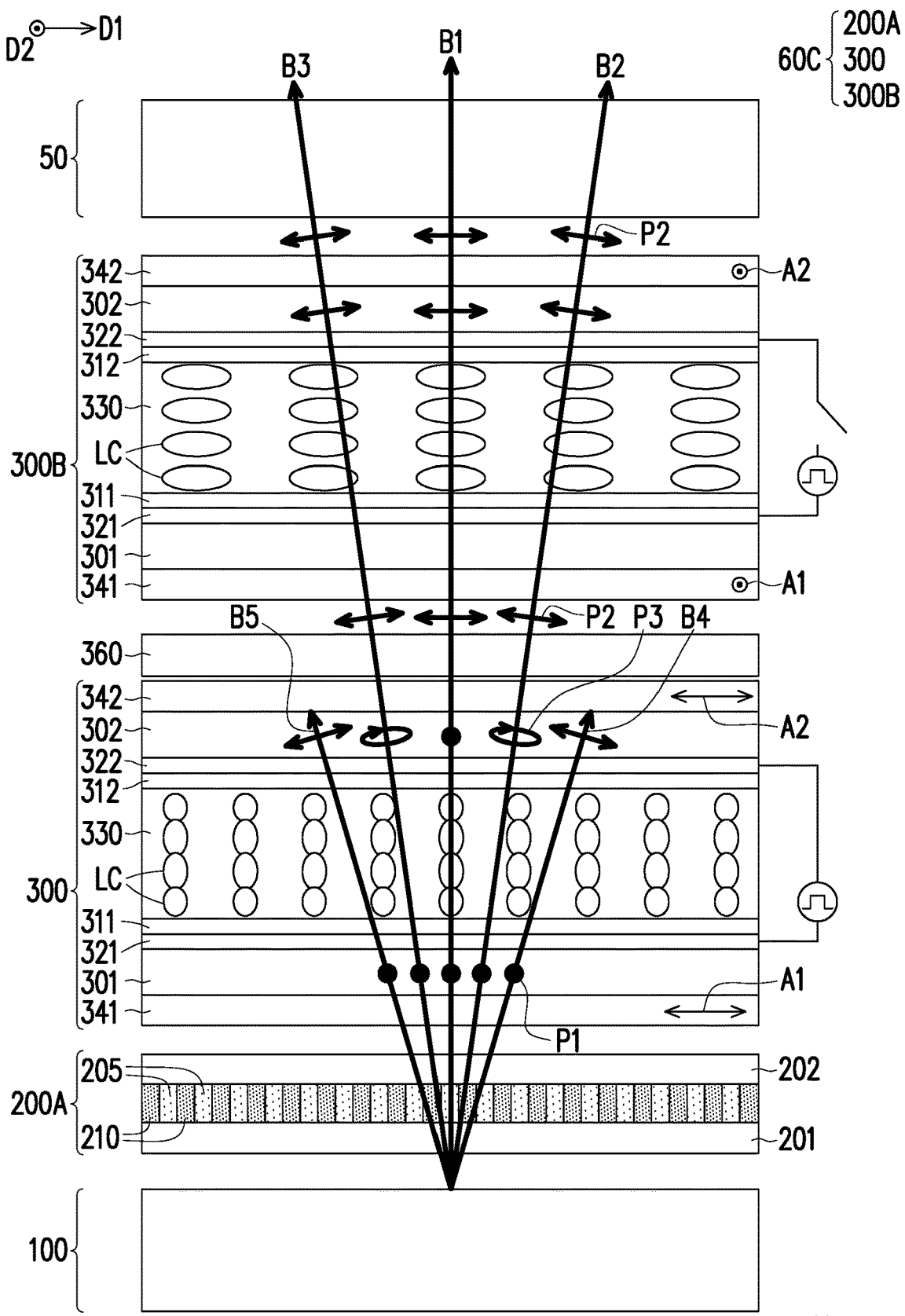
FIG. 10 and FIG. 11 are schematic cross-sectional views illustrating the display apparatus of FIG. 9 operating respectively under two anti-peep modes.
Figure 11:
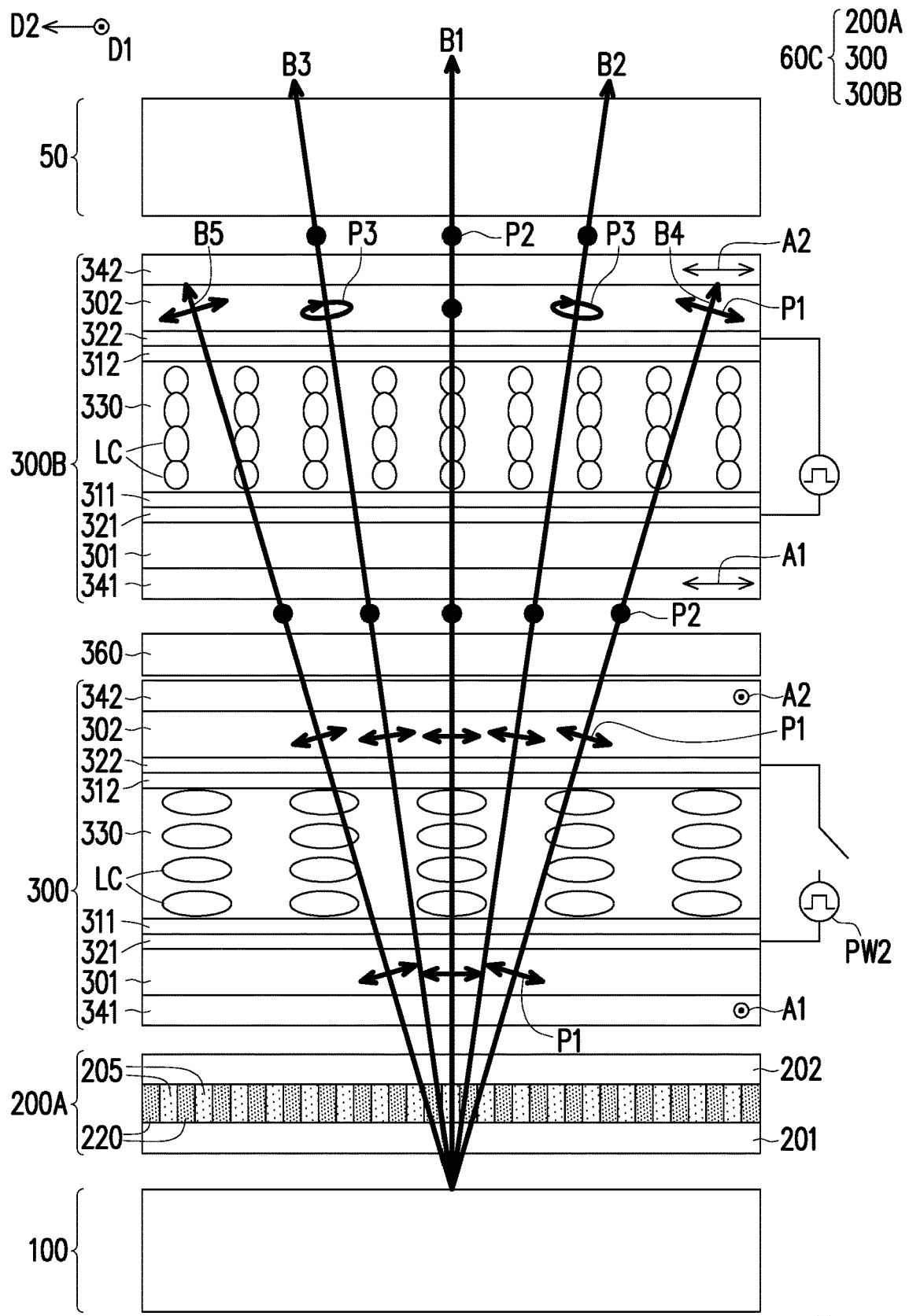

FIG. 9 is a schematic cross-sectional view illustrating a display apparatus operating under a sharing mode according to a fifth embodiment of the invention. FIG. 10 and FIG. 11 are schematic cross-sectional views illustrating the display apparatus of FIG. 9 operating respectively under two anti-peep modes. Referring to FIG. 9, a difference between the display apparatus 11 of the present embodiment and the display apparatus 10 of the previous embodiment lies in: the number of the electrically controlled viewing angle switch device being disposed. In the present embodiment, the viewing angle switch module 60C of the display apparatus 11 further includes an electrically controlled viewing angle switch device 300B, and the electrically controlled viewing angle switch device 300B is disposed between the display panel 50 and the electrically controlled viewing angle switch device 300.

It is to be particularly explained that, optical axes of the liquid crystal molecules LC of the electrically controlled viewing angle switch device 300B are parallel to the direction D1, the axial direction of the absorption axis A1 of the polarizer 341 of the electrically controlled viewing angle switch device 300B and the axial direction of the absorption axis A2 of the polarizer 342 of the electrically controlled viewing angle switch device 300B are parallel to the direction D2. In other words, the electrically controlled viewing angle switch device 300B can provide a large angle filtering effect in the direction D2. Since the axial direction of the absorption axis A1 of the polarizer 341 of the electrically controlled viewing angle switch device 300B are perpendicular to the axial direction of the absorption axis A2 of the polarizer 342 of the electrically controlled viewing angle switch device 300, the viewing angle switch module 60C further includes a half-wave plate 360, and the half-wave plate 360 is disposed between the electrically controlled viewing angle switch device 300 and the electrically controlled viewing angle switch device 300B. However, the invention is not limited thereto. In another embodiment, the axial directions of the absorption axis A1 of the polarizer 341 and the absorption axis A2 of the polarizer 342 of the electrically controlled viewing angle switch device 300B are perpendicular to the direction D2, that is, the axial directions of the absorption axis A1 of the polarizer 341 and the absorption axis A2 of the polarizer 342 of the electrically controlled viewing angle switch device 300B are parallel to the axial direction of the absorption axis A2 of the polarizer 342 of the electrically controlled viewing angle switch device 300, and the use of the half waveplate can be omitted.

In the following, various operational modes the display apparatus 11 are exemplarily described. First, when the display apparatus 11 is operated under the sharing mode, there is no potential difference between the first conductive layer 321 and the second conductive layer 322 of the electrically controlled viewing angle switch device 300, and the liquid crystal molecules LC, without being driven by an external electric filed, are arranged along the direction D2, that is, the optical axes of the liquid crystal molecules LC are parallel to the direction D2. However, the invention is not limited thereto. In other embodiments, an angle included between the optical axes of the liquid crystal molecules LC and the direction D1 may range from 70 degrees to 110 degrees. Similarly, there is no potential difference between the first conductive layer 321 and the second conductive layer 322 of the electrically controlled viewing angle switch device 300B, and the liquid crystal molecules LC, without being driven by an external electric filed, are arranged along the direction D1, that is, the optical axes of the liquid crystal molecules LC are parallel to the direction D1. However, the invention is not limited thereto. In other embodiments, an angle included between the optical axes of the liquid crystal molecules LC and the direction D2 may range from 70 degrees to 110 degrees. At this moment, the light beams B1-B5 emitted by the backlight module 100 each has a first linear polarization P1 after passing through the polarizer 341 of the electrically controlled viewing angle switch device 300. Since the liquid crystal layer 330 of the electrically controlled viewing angle switch device 300 does not produce any phase retardation for the light beams B1-B5 incident at different angles, the light beams B1-B5 still have the first linear polarization P1 after passing through the liquid crystal layer 330 of the electrically controlled viewing angle switch device 300, so that the light beams B1-B5 can be transmitted to the half-wave plate 360 after passing through the polarizer 342.

Undertake the above, since the half-wave plate 360 can produce a specific phase retardation for the light beams B1-B5 from the electrically controlled viewing angle switch device 300, polarization states of the light beams B1-B5 are transformed from the first linear polarization P1 to the second linear polarization P2 and the light beams B1-B5 pass through the polarizer 341 of the electrically controlled viewing angle switch device 300B. Next, since the liquid crystal layer 330 of the electrically controlled viewing angle switch device 300B does not produce any phase retardation for the light beams B1-B5 from the polarizer 341, the light beams B1-B5 still have the second linear polarization P2 after passing through the liquid crystal layer 330 of the electrically controlled viewing angle switch device 300B, so that the light beams B1-B5 can be transmitted to the display panel 50 after passing through the polarizer 342 of the electrically controlled viewing angle switch device 300B.

Referring to FIG. 10, when the display apparatus 11 intends to provide an anti-peep effect in the direction D1, the first conductive layer 321 and the second conductive layer 322 of the electrically controlled viewing angle switch device 300 are enabled and thus have different potentials, and an electric field generated by a potential difference between the two conductive layers can drive the liquid crystal molecules LC of the liquid crystal layer 330 to rotate. At this moment, because the liquid crystal layer 330 of the electrically controlled viewing angle switch device 300 can produce different phase retardations for the light beams B1-B5 incident at different angles, the light beams B1-B5 are enabled to respectively have different polarization states after passing through the liquid crystal layer 330. For example, after passing through the liquid crystal layer 330, the light beam B1 still has the first linear polarization P1, the light beam B2 and the light beam B3 respectively have an elliptical polarization P3, while the light beam B4 and the light beam B5 respectively have the second linear polarization P2. Therefore, in the light beams B1-B5 from the liquid crystal layer 330, only the light beam B1, the light beam B2 and the light beam B3 can pass through the polarizer 342 and be transmitted to the half-wave plate 360, while the light beam B4 and the light beam B5 are absorbed due to their polarization direction being parallel to the axial direction of the absorption axis A2 of the polarizer 342.

Undertake the above, since the half-wave plate 360 can produce the specific phase retardation for the light beams B1-B3 from the electrically controlled viewing angle switch device 300, polarization states of the light beams B1-B3 are transformed from the first linear polarization P1 to the second linear polarization P2 and the light beams B1-B3 pass through the polarizer 341 of the electrically controlled viewing angle switch device 300B. Next, since the electrically controlled viewing angle switch device 300B is disabled, causing the liquid crystal layer 330 thereof to not produce any phase retardation for the light beams B1-B3 incident at different angles, the light beam B1-B3 still have the second linear polarization P2 after passing through the liquid crystal layer 330 of the electrically controlled viewing angle switch device 300B, so that the light beams B1-B3 can be transmitted to the display panel 50 after passing through the polarizer 342 of the electrically controlled viewing angle switch device 300B. In this way, the viewing angle of the display apparatus 11 in the direction D1 can be reduced to provide the anti-peep effect.

On the other hand, it can be known from FIG. 11, when the display apparatus 11 intends to provide the anti-peep effect in the direction D2, the electrically controlled viewing angle switch device 300 is disabled, causing the liquid crystal layer 330 thereof to not produce any phase retardation to the light beams B1-B5 incident at different angles, and thus the light beams B1-B5, after passing through the liquid crystal layer 330 of the electrically controlled viewing angle switch device 300, still have the first linear polarization P1 and can pass through the polarizer 342 and be transmitted to the half-wave plate 360. Since the half-wave plate 360 can produce the specific phase retardation for the light beams B1-B5 from the electrically controlled viewing angle switch device 300, the polarization states of the light beams B1-B5 are transformed from the first linear polarization P1 to the second linear polarization P2 and the light beams B1-B5 pass through the polarizer 341 of the electrically controlled viewing angle switch device 300B.

Undertake the above, since the first conductive layer 321 and the second conductive layer 322 of the electrically controlled viewing angle switch device 300B are enabled, the first conductive layer 321 and the second conductive layer 322 have different potentials, and the electric field generated by the potential difference between the two conductive layers can drive the liquid crystal molecules LC of the liquid crystal layer 330 to rotate. At this moment, because the liquid crystal layer 330 of the electrically controlled viewing angle switch device 300B can produce different phase retardations for the light beams B1-B5 incident at different angles, the light beams B1-B5 are enabled to respectively have different polarization states after passing through the liquid crystal layer 330 of the electrically controlled viewing angle switch device 300B. For example, after passing through the liquid crystal layer 330 of the electrically controlled viewing angle switch device 300B, the light beam B1 still has the second linear polarization P2, the light beam B2 and the light beam B3 respectively have the elliptical polarization P3, while the light beam B4 and the light beam B5 respectively have the first linear polarization P1. Therefore, in the light beams B1-B5 from the liquid crystal layer 330 of the electrically controlled viewing angle switch device 300B, only the light beam B1, the light beam B2 and the light beam B3 can be transmitted to the display panel 50 through the polarizer 342, while the light beam B4 and the light beam B5 are absorbed due to their polarization direction being parallel to the axial direction of the absorption axis A2 of the polarizer 342. In this way, the viewing angle of the display apparatus 11 in the direction D2 can be reduced to provide the anti-peep effect.

It is to be particularly mentioned that, as shown in FIG. 10 and FIG. 11, in the present embodiment, the first block walls 210 of the viewing angle limiting device 200A can cooperate with the electrically controlled viewing angle switch device 300 to enhance the optical filtering effect of the viewing angle switch module 60C in the direction D1, and the second block walls 220 of the viewing angle limiting device 200A can cooperate with the electrically controlled viewing angle switch device 300B to enhance the optical filtering effect of the viewing angle switch module 60C in the direction D2. However, the invention is not limited to. In other embodiments, a viewing angle switch module having two electrically controlled viewing angle switch devices may also have a block wall configuration of a single direction.

In summary, in the viewing angle switch module according to an embodiment of the invention, through the cooperation between the extending direction of the block walls of the viewing angle limiting device and the axial direction of the optical axis of the liquid crystal layer of the electrically controlled viewing angle switch device, the large viewing angle filtering effect can be effectively enhanced. In addition, the display apparatus according to an embodiment of the invention, due to adopting the viewing angle switch module of the aforementioned embodiment, has excellent convenience when switching between the anti-peep mode and the sharing mode, and the large viewing angle filtering ability thereof is conducive to improving the anti-peep effect of the display apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A viewing angle switch module, comprising:
a viewing angle limiting device, having a plurality of first block walls, the first block walls being arranged along a first direction and extended in a second direction, and a light-transmitting region is disposed between any two adjacent first block walls; and
a first electrically controlled viewing angle switch device, overlapped with the viewing angle limiting device and comprising:
a first liquid crystal layer, wherein an angle of 90±20 degrees is included between an optical axis of the first liquid crystal layer and the first direction;
a first polarizer and a second polarizer, respectively located at two opposite sides of the first liquid crystal layer, and an absorption axis of the first polarizer and an absorption axis of the second polarizer being parallel or perpendicular to the first direction; and
at least one phase retardation film, disposed between the first polarizer and the second polarizer, wherein there is no polarizer between the first polarizer and the first liquid crystal layer, and there is no polarizer between the second polarizer and the first liquid crystal layer,
wherein a transmittance of each of the first block walls within a wavelength range of 400 nm to 700 nm is less than 50% and greater than 0%, and a transmittance of the viewing angle limiting device at a large viewing angle of greater than 45 degrees is determined by a number of the first block walls through which the light beam passes.

2. The viewing angle switch module as claimed in claim 1, wherein the viewing angle limiting device further comprises:
a plurality of second block walls, the second block walls being arranged along the second direction and extended in the first direction.

3. The viewing angle switch module as claimed in claim 2, further comprising:
a second electrically controlled viewing angle switch device, overlapped with the viewing angle limiting device and comprising:
a second liquid crystal layer, wherein an angle of 90±20 degrees is included between an optical axis of the second liquid crystal layer and the second direction; and
a third polarizer and a fourth polarizer, respectively located at two opposite sides of the second liquid crystal layer, and an absorption axis of the third polarizer and an absorption axis of the fourth polarizer being parallel to an absorption axis of the second polarizer.

4. The viewing angle switch module as claimed in claim 2, further comprising:
a second electrically controlled viewing angle switch device, overlapped with the viewing angle limiting device and comprising:
a second liquid crystal layer, wherein an angle of 90±20 degrees is included between an optical axis of the second liquid crystal layer and the second direction; and
a third polarizer and a fourth polarizer, respectively located at two opposite sides of the second liquid crystal layer, and an absorption axis of the third polarizer and an absorption axis of the fourth polarizer being perpendicular to an absorption axis of the second polarizer; and
a half-wave plate, located between the first electrically controlled viewing angle switch device and the second electrically controlled viewing angle switch device.

5. The viewing angle switch module as claimed in claim 2, wherein the viewing angle limiting device further comprise a plurality of third block walls arranged along the third direction, wherein the third direction intersects the first direction and the second direction.

6. The viewing angle switch module as claimed in claim 1, wherein the first electrically controlled viewing angle switch device further comprises a first alignment layer and a second alignment layer, and the first alignment layer and the second alignment layer respectively have a first alignment direction and a second alignment direction, wherein an angle of 90±20 degrees is included between the first alignment direction and the first direction, and an angle of 90±20 degrees is included between the second alignment direction and the first direction.

7. The viewing angle switch module as claimed in claim 1, wherein the at least one phase retardation film is located between the first liquid crystal layer and one of the first polarizer and the second polarizer, and the at least one phase retardation film is a negative C-type plate, an O-type plate or a composite board constituted by two A-type plates whose optical axes intersect each other.

8. The viewing angle switch module as claimed in claim 1, wherein the at least one phase retardation film comprises a first B-type plate and a second B-type plate, the first B-type plate is located between the first polarizer and the first liquid crystal layer, and the second B-type plate is located between the second polarizer and the first liquid crystal layer.

9. A display apparatus, comprising:
  a display panel;
  a viewing angle limiting device, overlapped with the display panel and having a plurality of first block walls, the first block walls being arranged along a first direction and extended in a second direction, and a light-transmitting region being disposed between any two adjacent first block walls; and
  a first electrically controlled viewing angle switch device, overlapped with the viewing angle limiting device and comprising:
    a first liquid crystal layer, wherein an angle of 90±20 degrees is included between an optical axis of the first liquid crystal layer and the first direction; and
    a first polarizer and a second polarizer, respectively located at two opposite sides of the first liquid crystal layer, and an absorption axis of the first polarizer and an absorption axis of the second polarizer being parallel to the first direction; and
    at least one phase retardation film, disposed between the first polarizer and the second polarizer, wherein there is no polarizer between the first polarizer and the first liquid crystal layer, and there is no polarizer between the second polarizer and the first liquid crystal layer,
  wherein a transmittance of each of the first block walls within a wavelength range of 400 nm to 700 nm is less than 50% and greater than 0%, and a transmittance of the viewing angle limiting device at a large viewing angle of greater than 45 degrees is determined by a number of the first block walls through which the light beam passes.

* * * * *